United States Patent [19]

Nakamura

[11] Patent Number: 4,765,124
[45] Date of Patent: Aug. 23, 1988

[54] EGG SORTING AND PACKING DEVICE

[75] Inventor: Yuzo Nakamura, Otsu, Japan

[73] Assignee: Nambu Electric Co., Ltd., Kyoto, Japan

[21] Appl. No.: 34,555

[22] PCT Filed: Jul. 16, 1986

[86] PCT No.: PCT/JP86/00365
§ 371 Date: Mar. 2, 1987
§ 102(e) Date: Mar. 2, 1987

[87] PCT Pub. No.: WO87/00623
PCT Pub. Date: Jan. 29, 1987

[30] Foreign Application Priority Data

Jul. 20, 1985 [JP] Japan .................................. 60-160948
Mar. 5, 1986 [JP] Japan .................................. 61-47777

[51] Int. Cl.⁴ ........................ G01G 13/00; B65B 23/06
[52] U.S. Cl. ........................................ 53/502; 53/534; 209/513
[58] Field of Search .................... 53/502, 534; 209/510, 209/512, 513, 564

[56] References Cited

U.S. PATENT DOCUMENTS

| 3,898,435 | 8/1975 | Pritchard et al. | 209/513 X |
| 3,948,765 | 4/1976 | Anschutz | 209/513 |
| 4,141,422 | 2/1979 | Cole et al. | 53/502 X |
| 4,610,126 | 9/1986 | DeSantis | 53/534 X |
| 4,632,254 | 12/1986 | Scopatz | 53/502 X |

FOREIGN PATENT DOCUMENTS

| 57-29651 | 6/1982 | Japan . | |
| 58-48846 | 10/1983 | Japan . | |
| 1394348 | 5/1975 | United Kingdom | 209/513 |
| 2127160 | 4/1984 | United Kingdom | 53/502 |

Primary Examiner—James F. Coan
Attorney, Agent, or Firm—Oblon, Fisher, Spivak, McClelland & Maier

[57] ABSTRACT

An egg sorting and packing device comprising means for measuring the weights of eggs supplied, means for storing a plurality of egg weights measured by the measuring means, means for selecting eggs to be combined such that the total weight of eggs per one pack falls within a predetermined weight range by properly selecting and combining the eggs without being restricted by the weight-based class divisions, and means for packing the eggs selected by the selecting means.

8 Claims, 7 Drawing Sheets

Fig.5-a memory positions P → | P1 | P2 | P3 | P4 | P5 | P6 | P7 | P8 | P9 | P10 | P11 |
---|---|---|---|---|---|---|---|---|---|---|---
egg weights W → | $w_1$ | $w_2$ | $w_3$ | $w_4$ | $w_5$ | $w_6$ | $w_7$ | $w_8$ | $w_9$ | $w_{10}$ | $w_{11}$ |

Fig.5-b memory positions P → | P11 | P10 | P9 | P8 | P7 | P6 | P5 | P4 | P3 | P2 | P1 |
---|---|---|---|---|---|---|---|---|---|---|---
egg weights W → | $w_{11}$ | $w_{10}$ | $w_9$ | $w_8$ | $w_7$ | $w_6$ | $w_5$ | $w_4$ | $w_3$ | $w_2$ | $w_1$ |

EGG SORTING AND PACKING DEVICE

BACKGROUND OF THE INVENTION

1. Field of the Invention

This invention concerns a sorting and packing device for sorting and packing eggs such as hen's eggs. More specifically, it relates to an egg sorting and packing device for mixing eggs belonging to several classes on the weight basis beyond the limit for each of the classes of the eggs to thereby obtain packs of a predetermined weight.

2. Discussion of Background

Hen's eggs are sold while being packed, for example, every ten pieces in a container made of plastics based on the weight divisions of SS (greater than 40 g—less than 46 g), S (46 g—less than 52 g), MS (52 g—less than 58 g), M (58 g—less than 64 g), L (64 g—less than 70 g), 2 L (70 g—less than 76 g) and non-standard (76 g—) by the trading standard of the Japanese Ministry of Agriculture Forestry and Fishery office. There are many sorting and packing devices of this type and the disposing performance thereof has been increased year by year.

However, upon selling in supermarkets and the likes, since leading packs for the classes are M and L classes, the unit prices per Kg are higher in the eggs of the M and L classes, while the unit prices per Kg in other classes of eggs ar lower at the present situation. In view of the above, eggs of the M and L classes have been sold by properly mixed with eggs of other classes for making the one pack weight uniform in order to overcome the foregoing evil effect.

As the countermeasure for the above, eggs once classified have been manually mixed and re-packed at present and, accordingly, this increases the cost and also increases the frequency of breaking eggs to thereby make it actually impossible to pack a large amount of them. As a method of successively measuring the weight of lump-like articles with scattered unit weight to thereby obtain a predetermined number of the articles, the total weight of which falls within a certain weight range, although a method as in Japanese Pat. Publication No. Sho 57-29651 has been known, the method is a so-called batchwise method and can not be adopted for the automatic packing of eggs in which they are conveyed in a single row without stopping and treated in a great amount.

The object of this invention is to provide a sorting and packing device for properly selecting and combining eggs without being restricted by the conventional weight-based divisions for each of the classes and packing the eggs so as to fall within the range of a predetermined weight per one pack.

DISCLOSURE OF THE INVENTION

The device according to this invention is so adapted as to determine an aimed weight for one pack, regarding eggs within the range of permissible error as those within the setting weight range, determine selection conditions for combination based on the unit weight value obtained by dividing the value of the aimed weight by the number in one pack and successively carry out the combination in accordance with the conditions.

Further, there is disposed means for selecting hen's eggs within a range of one combination and then again judging individual eggs out of the range of the previous combination as the object of the combination, even if hen's eggs out of the combination range are supplied successively, whereby the eggs that can not be used for the combination in mixed packs. can be decreased.

BRIEF DESCRIPTION OF DRAWINGS

FIG. 3 is an electrical block diagram for the embodiment shown in FIG. 1, FIGS. 4a and 4b are flow charts illustrating one example of the program executed in the embodiment shown in FIG. 1, FIGS. 5a and 5b are explanatory views for the memory state in the memory device shown in FIG. 1, and FIGS. 6a and 6b are flow charts illustrating another example of the program executed in the embodiment shown in FIG. 1.

DETAILED DESCRIPTION OF THE PREFERRED EMBODIMENTS

For explaining this invention in more detail, this invention will now be explained referring to a preferred embodiment shown in the drawings.

Figure 1:
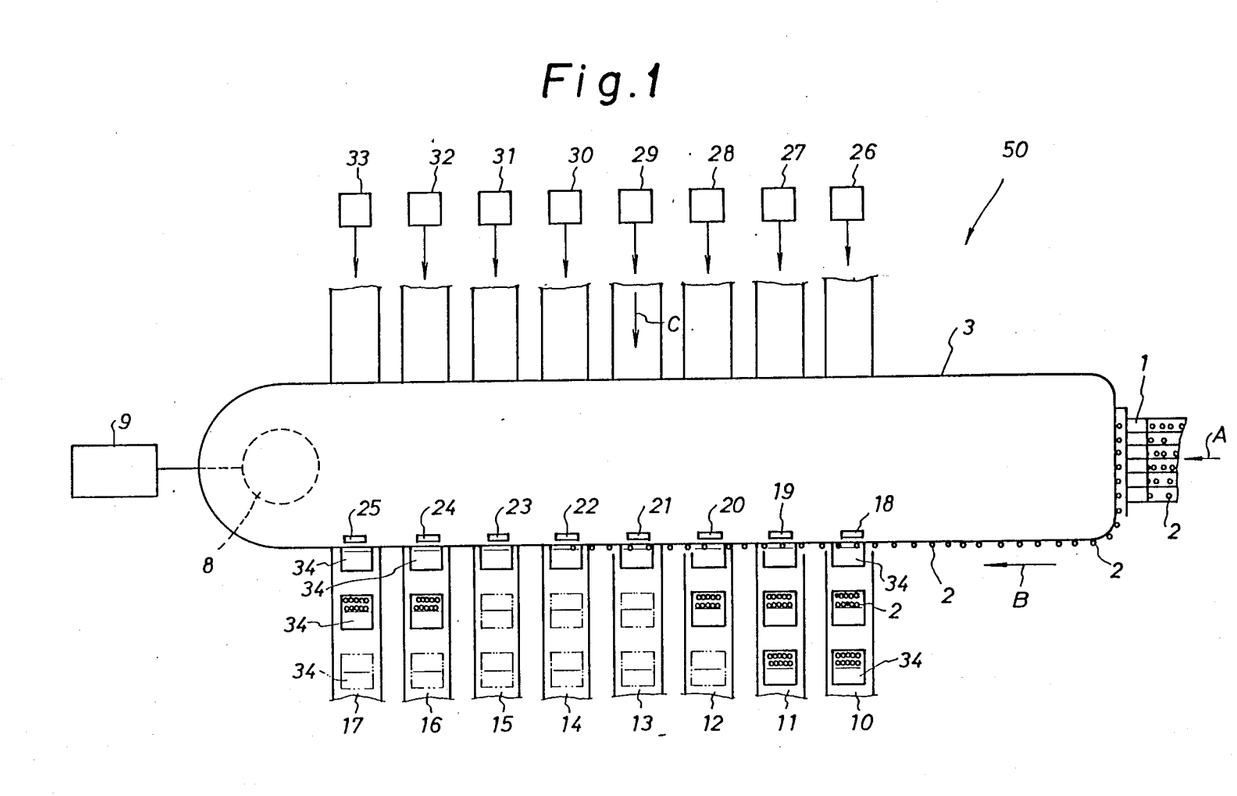
FIG. 1 is a schematic view for a preferred embodiment according to this invention.
Figure 2:
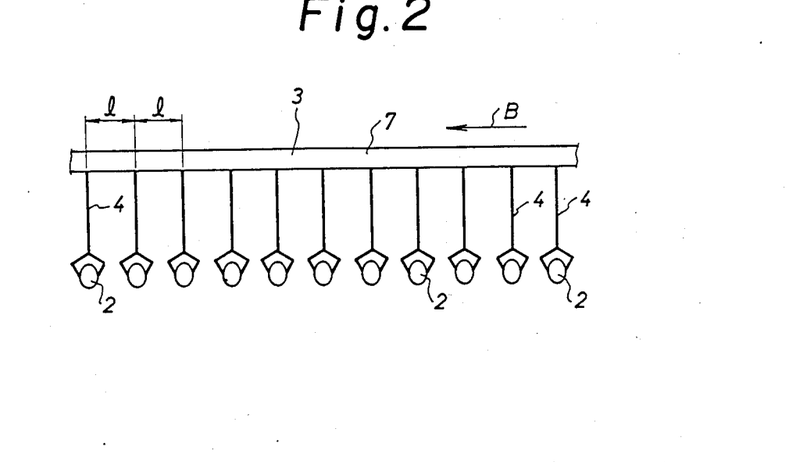
FIG. 2 is a detailed fragmentary view for the embodiment shown in FIG. 1.
Figure 3:
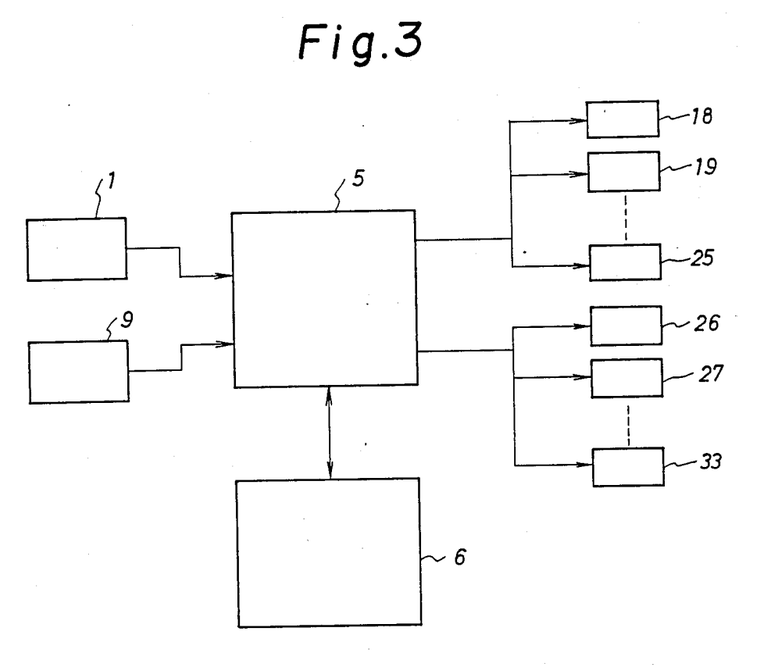

FIG. 1 is a schematic view for a preferred embodiment according to this invention, in which meters 1 successively measure the weight of eggs 2 supplied by a conveying device or by manual works from the direction A. In this embodiment, although the meters 1 are disposed by six for measuring the eggs 2 supplied in parallel as six rows, this invention no way limited thereto but the meter may be one in a case of eggs supplied in a row. The eggs 2 measured by the meters 1 are successively held by grip portions 4 of a conveying device 3 and conveyed in a row along the direction B as shown in FIG. 2. As the grip portion 4, that of the constitution as disclosed in Japanese Pat. Laid Open Application No. Sho 57-13024 may be employed. Each weight of the eggs 2, that is, egg weight measured by the meter 1 is stored in a memory device 6 in the same sequence as the conveying sequence of the eggs 2 under the control of a control device 5 comprising a microcomputer or the like as shown in FIG. 3. The meaning of the same sequence referred to herein does not restricted to the physically identical sequence but it is only necessary that a correspondence is obtained between a stored egg weight and a position of the egg showing such an egg weight in the conveying device 3. The conveying device 3 is attached with the grip portion 4 as described above and comprises an endless chain 7 for moving the grip portions 4 in the direction B, a motor 8 for running the endless chain 7 and the like, in which the motor 8 is connected with an encoder 9 for detecting the running amount of the endless chain 7, that is, the running amount of the grip portion 4. The running amount detected by the encoder 9 is supplied to the control device 5. The control device 5 executes programs shown by the flow charts illustrated in FIGS. 4a and 4b, as well as FIGS. 6a and 6b, actuates release mechanisms 18–25 and drive mechanisms 26–33 disposed corresponding to packing lines 10–17 respectively based on the results of the execution, reads the egg weight from the meter 1 and signals for the normal or abnormal eggs from an egg detector (not illustrated) and then instructs the memory device 6 to store the egg weight or the like. The judging mechanism as disclosed in Japanese Pat. Publication No. Sho 56-49221 (claiming the priority right on U.S. patent application No. 449871, Mar. 11, 1974 now U.S. Pat. No. 3,898,435) is used as the mechanism for detecting that the egg 2 held by the grip portion 4 has been conveyed to a predetermined release position by the endless chain 7 and sending a release instruction to the release mechanisms 18-25. The release mechanisms 18-25 release from the grip portions 4 the eggs 2 having arrived at the packing lines corresponding to the release mechanisms by the release instruction from the control device 5 respectively. The released eggs 2 are charged in packing containers 10 placed on the packing lines, for example, a container 34 made of plastics capable of packing 10 pieces. The drive mechanisms 26-33 forward the respective belt conveyors of the packing lines 10-17 by one-half step or full—step by a half—step or full—step instruction from the control device 5 respectively. Upon the half—step instruction from the control device 5, charging of the eggs on one row of the container 34 is completed and the movement for about one-half of the container 34 is conducted by the belt conveyor for charging the eggs to the other row, whereas, upon the full—step instruction, charging of the eggs is completed for the two rows of the container 34 and movement for about the distance between two containers is conducted by the belt conveyor for charging the eggs to the next container. While the container 34 is capable of packing five eggs for each row, that is, ten in total are used in this embodiment, this invention is no way limited thereto. There are conducted packing for the eggs out of the standard in the weight division on the packing line 10, packing for the eggs in the weight division SS on the packing line 11, packing for the eggs in the weight division S on the packing line 12, packing for the eggs in the weight division 2 L on the packing line 14, packing for the weight division L on the packing line 15, packing for the weight division M on the packing line 16, and packing for the weight division MS on the packing line 17 respectively, while packing according to this invention on the packing line 13.

Figure 4A:
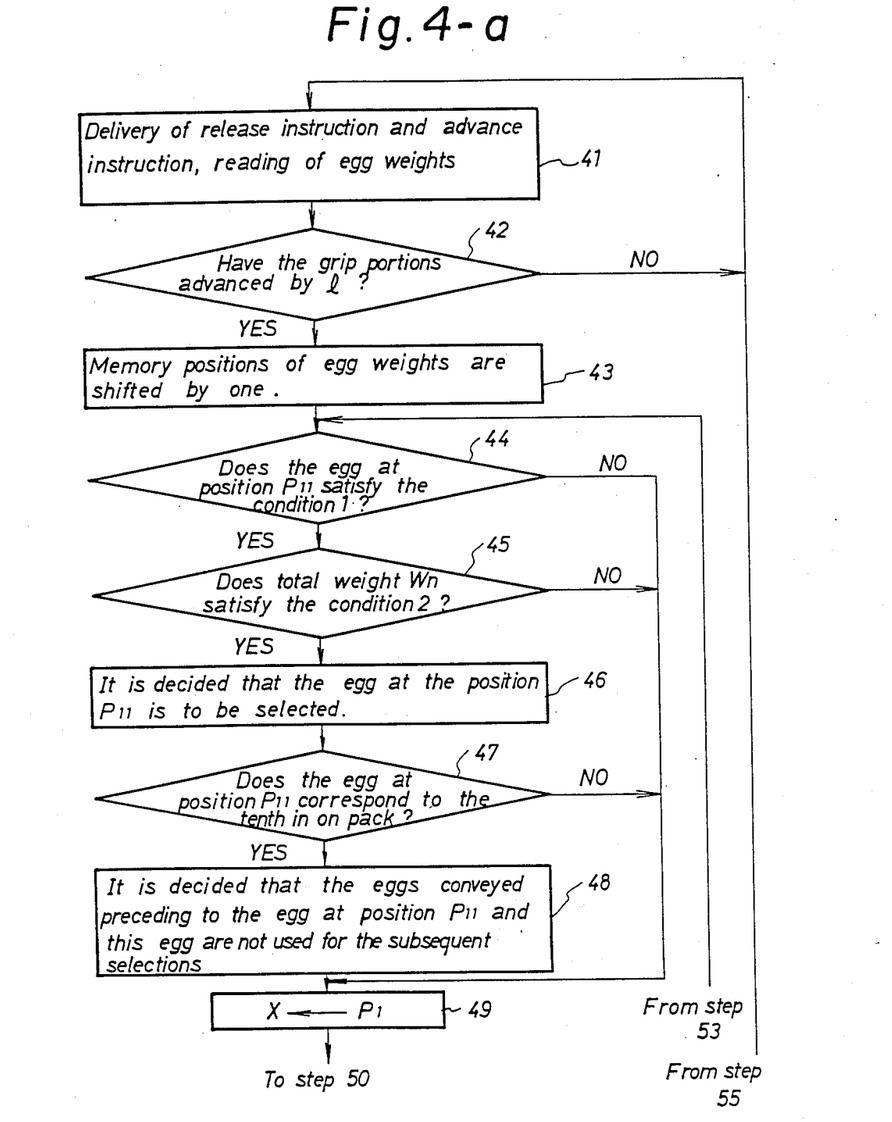
Figure 4B:
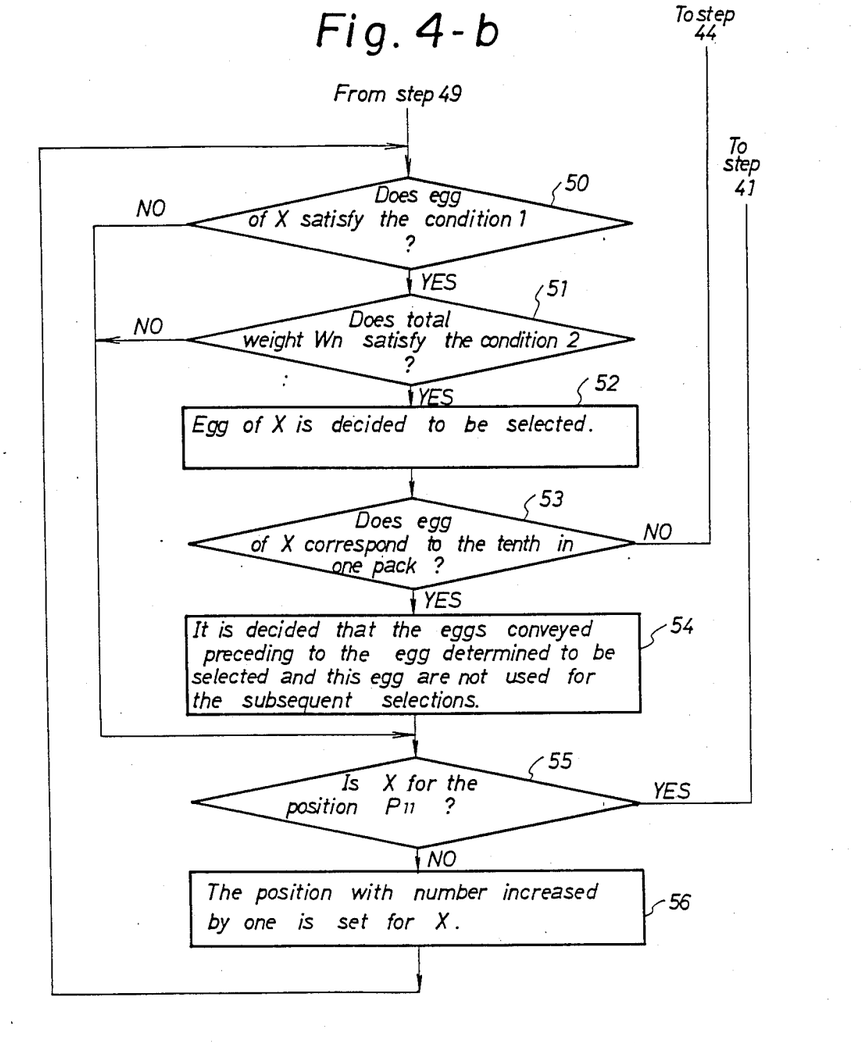

Then, the operation of the egg sorting and packing device 50 constituted as described above will be explained along with the flow chart.

Figure 5A:
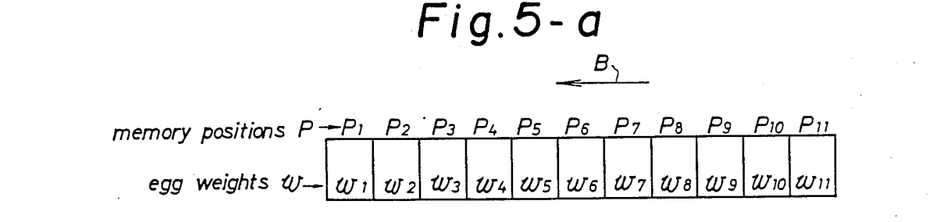

FIGS. 4a and 4b are flow charts illustrating one example of a program executed in the embodiment shown in FIG. 1. At first, at a step 41, delivery of a release instruction to the release mechanisms 18-25, delivery of a half—step instruction or full—step instruction to the drive mechanisms 26-33, reading of one egg weight from the meter 1 and storing of the read egg weight in the memory device 6, reading of information from the egg detector as to if the egg is normal or not and the reading of the running amount from the encoder 9 are conducted by the control device 5. At the step 42, as a result of the reading of the running amount from the encoder 9, it is inspected if the grip portion 4 has been advanced by a unit length, that is, by the distance 1 between the grip portions 4 or not. If the grip portion has not advanced by the distance 1, operation of the control device is returned to the step 41. If it has advanced by the distance 1, at the step 43 the memory positions P for the egg weights W stored in the conveying order in the memory device 6 are shifted by one and the egg weight corresponding to the egg conveyed foremost is eliminated therefrom and the egg weight of the egg conveyed next to the last egg is newly stored at the memory position corresponding to the lowermost in the conveying order. That is, in a case as shown, for example, in FIG. 5a where there are 11 memory positions P for the egg weight in the memory device 6 and the egg weights for 11 eggs of an egg conveyed foremost to 11 eggs conveyed subsequent to the egg conveyed foremost are stored from the position P1 to the position P11, at the step 43 the egg weight W1 stored at the position P1 is eliminated, the egg weight W2 stored at the position P2 is stored at the position P1, the egg weight W3 stored at the position P3 is stored at the position P2 and the like and, finally, the egg weight of the egg conveyed subsequent to the egg showing the egg weight W11 stored at the position P10 is newly stored in the position P11. Then, at the step 44, it is judged whether the four conditions (hereinafter referred to as condition 1) that the egg showing the egg weight stored at the position P11 is a normal egg (obtained from the egg detector), the egg has not been determined to be selected for a pack prior to the present time (obtained from the results of steps 46 and 52), the egg has not been determined to not be used for the selection (obtained from the results of the steps 48 and 54) and the weight of the egg is between predetermined upper selection limit weight WU and lower selection limit weight WL are satisfied or not. If the first condition is not satisfied, operation of the control device is advanced to the step 49. While on the other hand, if the first condition is satisfied, at the step 45 it is judged whether the total weight Wn obtained by adding the egg weight at the position P11 to the total weight for the sum of the egg weights of the eggs already determined to be selected is present within a range between WL (1) and WU (1) or not (hereinafter referred to as the condition 2). WL (n) and WU (n) can be determined by the following equations:

$$WL\ (n) = (n+1)Wa - WU$$

$$WU\ (n) = (n+1)Wa - WL.$$

The total weight Wn of the eggs in the pack is restricted to:

$$WL\ (n) < Wn < WU\ (n)$$

where WU=upper limit weight for one egg to be used for the combination
WL=lower limit weight for one egg to be used for the combination
Wa=setting weight (g)×1/10
n=the number within the pack
and further WL (10) and WU (10) are treated by the following equations:

$$WL\ (10) = WTL,\ WU\ (10) = WTU.$$

Accordingly, it is judged at the step 45 whether the total weight Wn satisfies the following equation or not:

$$WL\ (n) < Wn < WU\ (n).$$

If the egg weight at the position P11 does not satisfy the condition 2, operation of the control device is advanced to the step 49. If the condition 2 is satisfied, at the step 46 the egg showing the egg weight at the position P11 is determined to be selected in one packing. At the step 47, it is judged whether the selection of the eggs showing the egg weight at the position P11 corresponds to the 10th egg in the selection for one packing or not and, if the selection does not correspond to the 10th, operation of the control device is advanced to the step 49. If the selection corresponds to the 10th, it is determined at the step 48 that the egg showing the egg weight at the position 11 and the eggs conveyed preceding to this egg are not used for the selection hereinafter. Then, at the step 49, the position P1 is set as variant X and it is judged at the step 50 if the egg of the variant X satisfies the condition 1 or not. In other words, it is judged at the step 50 if the egg showing the egg weight at the position P1 satisfies the condition 1 or not, and operation of the control device is advanced to the step 55 if the condition 1 is not satisfied. If the condition 1 is satisfied, at the step 51 it is judged for the egg weight at the position P1 if the same condition 2 as in the judgement executed at the step 45 is satisfied or not, and if the condition 1 is not satisfied, operation of the control device is advanced to the step 55. If the condition 1 is satisfied, at the step 52 the same determination as that executed at the step 46 is carried out for the egg showing the egg weight at the position P1. At the step 53, the same judgement as that executed at the step 47 is performed to the egg showing the egg weight at the position P1 and if the selection of the egg showing the egg weight at the position P1 does not correspond to the 10th, operation of the control device is returned to the step 44. If the selection corresponds to the 10th, it is determined at the step 54 that the egg conveyed last and those conveyed preceding to the egg among the first to 10th eggs determined to be selected are not used hereinafter for the selection. Then, at the step 55, it is judged if the variant X is for P11 or not, and if the variant X is for the position P11, operation of the control device is returned to the step 41. If the variant X is not for the position P11, at the step 56 the position set for the variant X is increased by one, that is, if the variant X is set for the position P5, the position P5 is increased to the position P6 and if it is set for P6, P6 is increased to the position P7 and then operation of the control device is returned to the step 50, wherein the foregoing procedures are repeated. The eggs determined to be selected as described above are released from the grip portion 4 and charged into the container 34 by the delivery of the release instruction due to the execution at the step 41 when the eggs are conveyed by the conveying device 3 and brought into the position for the packing line 13. Then, when the charging of 5 eggs to the container 34 has been completed, the control device 5 sends the half—step instruction to the driving mechanism 29 upon execution of the step 41, by which the driving mechanism 29 causes the conveyor to run for forwarding the container 34 by one—half step in the direction C. When the 10 eggs have been charged, the control device 5 sends the full-step instruction to the driving mechanism 29 by the execution of the step 41, by which a new container is prepared for one packing.

Those eggs which have not been selected by the foregoing operations are respectively charged into the containers on the conveyors 10-12 and 14-17 in accordance with the ordinary weight divisions.

Then, combination of eggs will be explained in accordance with the actual weight table shown in Table 2 based on flow charts of FIGS. 4a and 4b.

TABLE 1

Restriction table for the total weight of eggs when the number within the pack is n

| Number | Weight in Pack (Lower limit) | Weight in Pack (Upper limit) |
|---|---|---|
| 1 | WL (1) = 2Wa - WU | WU(1) = 2Wa - WL |

TABLE 1-continued

Restriction table for the total weight of eggs when the number within the pack is n

| Number | Weight in Pack (Lower limit) | Weight in Pack (Upper limit) |
|---|---|---|
| 2 | WL (2) = 3Wa - WU | WU(2) = 3Wa - WL |
| 3 | WL (3) = 4Wa - WU | WU(3) = 4Wa - WL |
| 4 | WL (4) = 5Wa - WU | WU(4) = 5Wa - WL |
| 5 | WL (5) = 6Wa - WU | WU(5) = 6Wa - WL |
| 6 | WL (6) = 7Wa - WU | WU(6) = 7Wa - WL |
| 7 | WL (7) = 8Wa - WU | WU(7) = 8Wa - WL |
| 8 | WL (8) = 9Wa - WU | WU(8) = 9Wa - WL |
| 9 | WL (9) = 10Wa - WU | WU(9) = 10Wa - WL |
| 10 | WL (10) = WTL | WU(10) = WTU |

*eggs used for the combination: WL < egg weight < WU
*total weight of eggs: WL (n) < Wn < WU (n)
Wa = set weight (g) × 1/10
WU = upper limit weight for one egg used for the combination
WL = lower limit weight for one egg used for the combination
n = the number in the pack
Wn = total weight of eggs where number within the pack is n

TABLE 2

Actual Egg Weight Table

| weighing order | 1 | 2 | 3 | 4 | 5 | 6 |
|---|---|---|---|---|---|---|
| egg weight (g) | 62.5 | 62.6 | 62.7 | 0.0 | 59.1 | 52.7 |
| combining order | a1 | a4 | a5 |  | a2 | a3 |
| weighing order | 7 | 8 | 9 | 10 | 11 | 12 |
| egg weight (g) | 61.5 | 57.4 | 64.0 | 56.9 | 65.7 | 60.5 |
| combining order | a7 | a6 |  | a8 |  | a9 |
| weighing order | 13 | 14 | 15 | 16 | 17 | 18 |
| egg weight (g) | 63.2 | 57.1 | 59.2 | 63.1 | 61.6 | 57.6 |
| combining order |  | a10 | b1 | b2 | b3 | b4 |
| weighing order | 19 | 20 | 21 | 22 | 23 | 24 |
| egg weight (g) | 66.0 | 56.4 | 63.0 | 57.3 | 59.0 | 63.9 |
| combining order |  | b5 | b6 | b7 | b8 |  |
| weighing order | 25 | 26 | 27 | 28 | 29 | 30 |
| egg weight (g) | 60.1 | 56.6 | 61.0 | 58.4 | 52.0 | 68.9 |
| combining order | b9 | b10 | c1 | c2 | c3 | c4 |
| weighing order | 31 | 32 | 33 | 34 | 35 | 36 |
| egg weight (g) | 58.9 | 63.1 | 63.0 | 59.0 | 57.4 | 61.9 |
| combining order | c5 | c8 |  | c6 | c7 |  |
| weighing order | 37 | 38 | 39 | 40 | 41 | 42 |
| egg weight (g) | 0.0 | 58.2 | 66.0 | 58.2 | 63.6 | 59.8 |
| combining order |  |  |  | c9 |  |  |
| weighing order | 43 | 44 | 45 | 46 | 47 | 48 |
| egg weight (g) | 58.9 | 55.6 | 62.8 | 69.7 | 59.4 | 58.9 |
| combining order |  | c10 | d1 |  | d2 | d3 |
| weighing order | 49 | 50 | 51 | 52 | 53 | 54 |
| egg weight (g) | 0.0 | 59.0 | 62.8 | 64.7 | 60.7 | 69.5 |
| combining order |  | d4 |  |  | d5 |  |

0.0 = not weighed egg, E 1, 2, 3 = abnormal egg, a, b, c = combinations.

Table 1 is a restriction table for the total weight of eggs where the number within the pack is n. In the case of obtaining a mixed pack in accordance with the restriction table, if the calculation is made assuming the set weight, for example, to 590 g, the lower limit in the case where the number n within the pack is for the first is calculated as a weight obtained by subtracting the maximum weight 76 g of the highest class 2 L to be combined into the mixed pack from the weight of the two with the average weight 59 g for one with respect to the set weight 590 g, that is, 2×59−76=42 g. While the upper limit is calculated, in the same manner, as the weight obtained by subtracting the minimum weight 52 g of the lowest class MS to be combined into the mixed pack from the weight of the two with the average weight, that is, 2×59−52=66 g. Then, the egg weight 62.5 g for the first egg among the eggs with the actual egg weights shown in Table 2 is selected as the first egg in the pack a.

In the case of the second egg, the lower limit is determined as the weight obtained by subtracting the maximum egg weight 76 g from the weight of the three with the value of the average weight, that is, 3×59−76=101 g. In the same manner, the upper limit is obtained by subtracting the minimum egg weight 52 g from the weight of the three with the value of the average weight, that is, 3×59−52=125 g. Since this range is the limit weight for the sum of the two eggs, the weight obtained by subtracting the egg weight 62.5 g selected as the first is the limit weight for the second. Accordingly the lower limit is 101−62.5=38.5 g, while the upper limit is 125−62.5=62.5 g. Since the second egg of 62.6 g in Table 2 is out of the range of the limit weight, the second egg is not selected.

Then, the third egg of 62.7 g is not selected as the second combination due to the same reason. Since the 5th egg of 59.1 g is within the limited range, it is selected as the second in the pack a to be added to the combination.

The limit weight for the third is calculated in the same manner as described above as 38.4 g–62.4 g. In this case, the egg weights for the second and the third that were not selected in the previous combination are checked as to if they are within the range of the limit weight. In this case, since both of the egg weights are out of the range of the limit weight and accordingly have not selected, the next 6th egg of 52.7 g is selected and added to the combination as the third in the pack a.

The range of the fourth is calculated in the same manner as described above as the range from 44.7 g−68.7 g. Also in this case, when the egg weights for the second and the third that were not selected in the previous combination are at first checked, since the second egg of 62.6 g falls within the range in this case, it is selected as the fourth in the pack a.

If the range for the 5th is calculated in the same manner as described above, the third egg of 62.7 g egg weight is selected as an egg for the 5th combination in the pack a.

The calculation is made in the same manner hereinafter and the selection for obtaining the combination is carried out by combining, as shown in the combining sequence shown in Table 2, the 8th egg for the 6th combination, the 7th egg for the 7th combination successively and the 14th egg as for the 10th combination to obtain the combination for 10 eggs. As a result, at the time when the combination for the 10 eggs has been completed, since the 9th egg of 64 g, the 11th egg of 65.7 g and the 13th egg of 63.2 g egg are excluded from the present combination, they are respectively charged to the packs of the corresponding classes (L) and (M) as the eggs which have not been used for the combination.

Then, combination for the pack b is started, in which the 15th–18th eggs are employed for the first to 4th combinations in the pack b and, skipping by one, the 20 to 23th eggs are used for the 5th to 8th combinations in the pack b. Hereafter, in the same procedures, the combination as shown in Table 2 can be obtained.

Figure 6A:
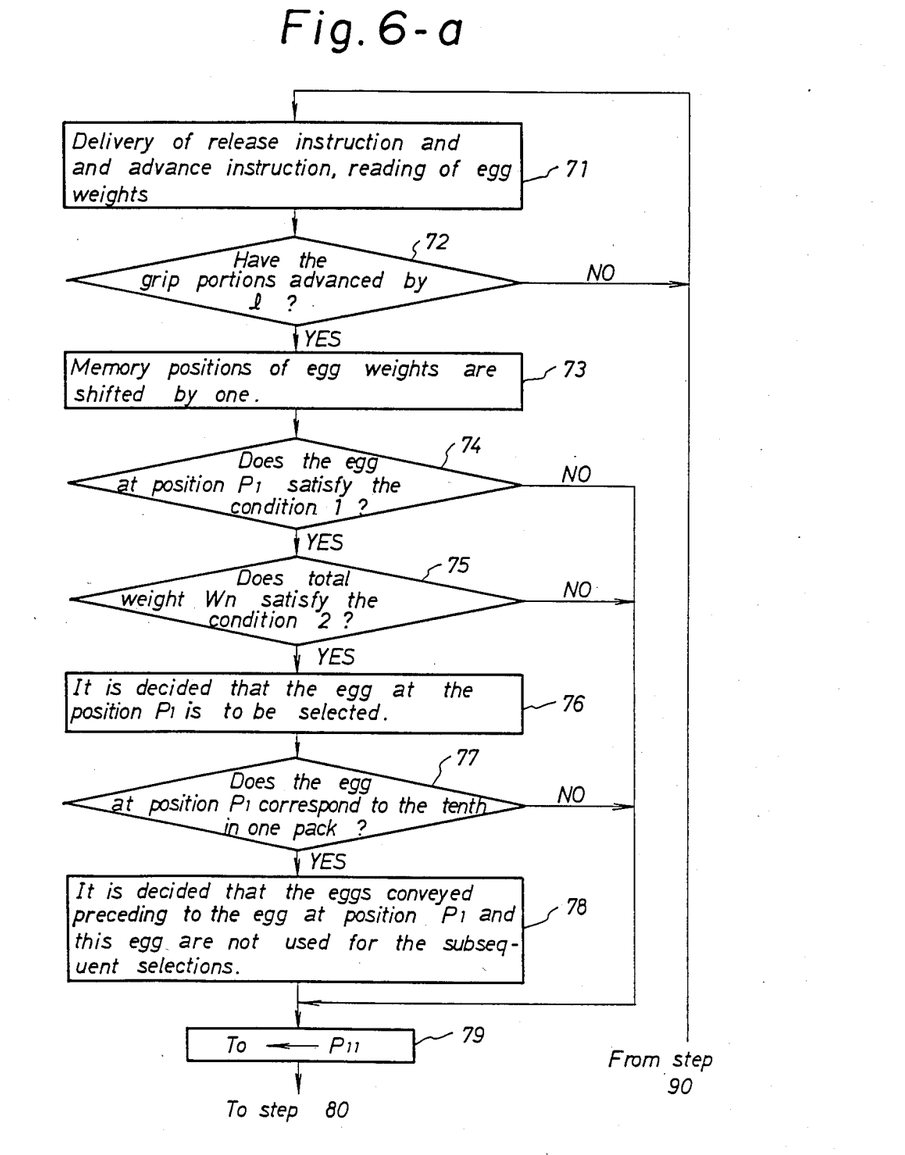
Figure 6B:
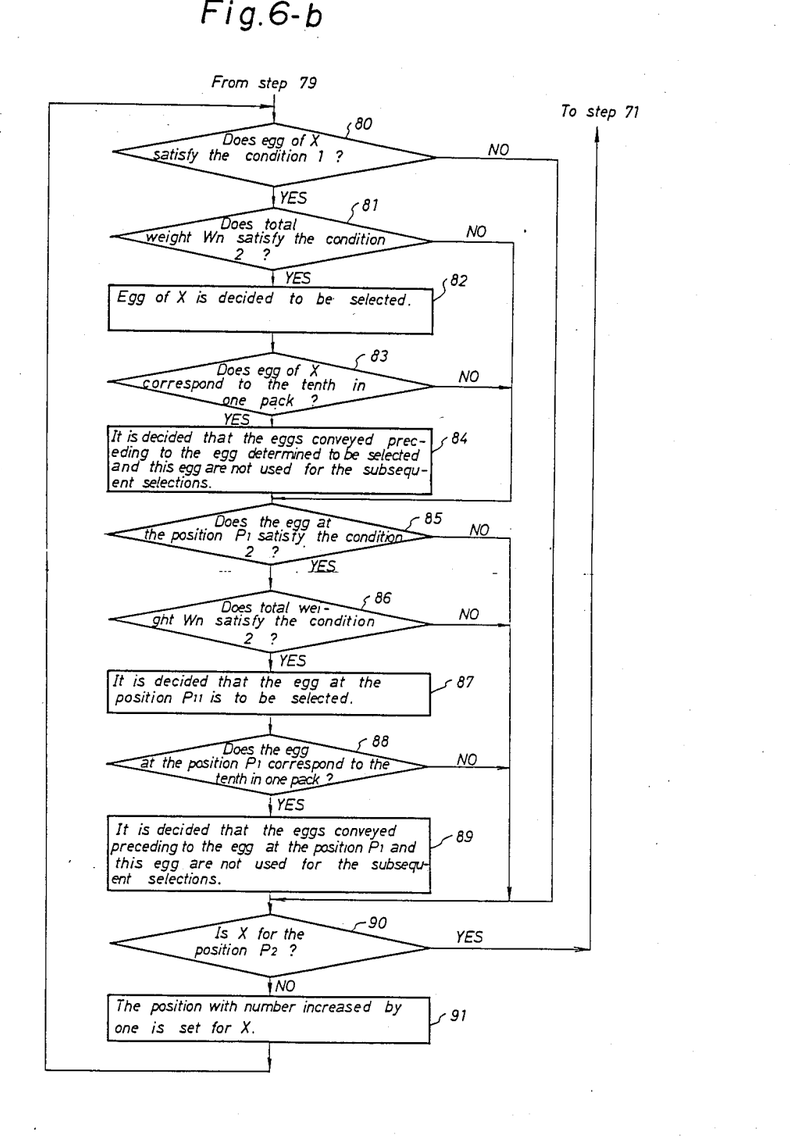

FIGS. 6a and 6b are flow charts showing another example of a program executed in the embodiment shown in FIG. 1. In these flow charts, there are at first conducted by the control device 5 at the step 71 the delivery of a release instruction to the release mechanisms 18–25, delivery of one—half step instruction or full—step instruction to the driving mechanisms 26–33, reading of one egg weight from the metering device 1 and the storing of the thus read egg weight into the memory device 6, reading of the information from the egg detector as to whether it is a normal egg or not, and the reading of the running amount from the encoder 9.

Figure 5B:
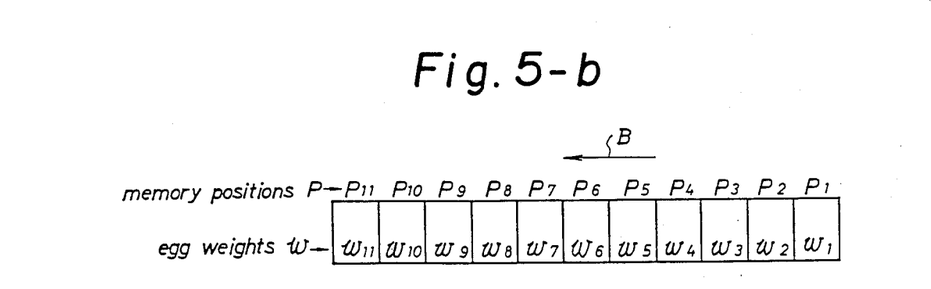

At the step 72, based on a result of the reading for the running amount from the encoder 9, it is examined if the grip portion 4 has advanced by one unit distance, that is, by the distance l between the grip portions 4 or not and if the grip portion is not advanced by the distance l, operation of the control device is returned to the step 71. If the grip portion has advanced by the distance L, as shown in FIG. 5b at the step 73 the memory positions P for the egg weights W stored in the conveying order in the memory device 6 are shifted by one and the egg weight corresponding to the egg conveyed foremost is thereby eliminated, while the egg weight of the egg conveyed next to the last egg is newly stored in the memory position corresponding to the last position in the conveying order.

That is, for example, if there are 11 memory positions P for the egg weight in the memory device 6 and the egg weights for 11 eggs subsequent to the egg conveyed foremost are stored from the positions P11 to P1, at the step 73 the egg weight W11 stored at the position P11 is eliminated, the egg weight W10 stored at the position P10 is stored to the position P11, the egg weight W9 stored at the position P9 is stored at the position P10 and the like and, finally, the egg weight of the egg conveyed subsequent to the egg showing the egg weight W1 stored at the position P2 is stored newly at the position P1. Then, at the step 74 it is judged whether the four conditions (hereinafter referred to as condition 1) that the egg showing the egg weight stored at the position P1 is a normal egg (obtained from the egg detector), the egg has not been determined to be selected in a pack before the present time (obtained from the results of the steps 76, 82 and 87), the egg has not been determined to not be used for the selection (obtained from the results of the steps 78, 84 and 89) and the egg weight of this egg is present between the predetermined upper selection limit weight WU and the predetermined lower selection limit weight WL are satisfied or not. If the first condition is not satisfied, operation of the control device is advanced to the step 79. If the first condition is satisfied, it is judged at the step 75 whether the total weight Wn obtained by adding the egg weight at the position P1 to the total weight for the sum of the egg weights of the eggs already determined to be selected is present within the range between the values WL1 and WU1 (hereinafter referred to as condition 2) or not. The values WLn and WUn can be determined by the following equations.

$$WLn = (n + 1) Wa - WU$$
$$WUn = (n + 1) Wa - WL$$
where
$$Wa = \frac{WTU + WTL}{2} \times \frac{1}{10}$$

WTU : predetermined aimed upper limit weight
WTL : predetermined aimed lower limit weight
n : a value obtained by adding 1 to the number of the already selected eggs, and WL10=WTL, WU10=WTU Accordingly, it is judged at the step 75 whether the total weight Wn satisfies the following equation or not.
$$WLn \leq Wn \leq WUn$$
provided that the following equation is used for W10:
$$WTL \leq W10 \leq WTU.$$
If the egg weight at the position P1 does not satisfy the condition 2, operation of the control device is advanced to the step 79. If it satisfies the condition 2, it is determined at the step 76 that the egg showing the egg weight at the position P1 is to be selected in one pack. It is judged at the step 77 whether the selection of the egg showing the egg weight at the position P1 corresponds to the 10th egg in the selection for one pack or not. If the selection does not correspond to the 10th egg, operation of the control device is advanced to the step 79. If it corresponds to the 10th egg, it is determined at the step 78 that the egg showing the egg weight at the position P1 and the eggs conveyed preceding to this egg are not used for the subsequent selections. Then, at the step 79, the position P11 is set as a variant X and it is judged at the step 80 whether the egg for the variant X satisfies the condition 1 or not. In other words, it is judged at the step 80 whether the egg showing the egg weight at the position P11 satisfies the condition 1 or not, and if the condition 1 is not satisfied, operation of the control device is advanced to the step 90. If the condition 1 is satisfied, it is judged at the step 81 whether the same condition 2 as that for the judgement executed in the step 75 to the egg weight at the position P11 is satisfied or not, and if the condition 2 is not satisfied, operation of the control device is advanced to the step 85. If it is satisfied, at the step 82 the same determination as that executed at the step 76 for the egg showing the egg weight at the position P11 is carried out. At the step 83, the same judgement as that made at step 77 is carried out for the egg showing the egg weight at the position P11 and, if the selection for the egg showing the egg weight at the position P11 does not correspond to the 10th operation of the control device is advanced to the step 85. If the selection corresponds to the 10th, it is determined at the step 84 that the eggs conveyed preceding to the egg conveyed last among first to 10th eggs determined to be selected, including the last egg, are not used for the subsequent selections. Then, it is again judged at the step 85 whether the egg showing the egg weight at the position P1 satisfies the condition 1 or not, and if the condition 1 is not satisfied, operation of the control device is advanced to the step 90. If it is satisfied, at the step 86, the judgement as to whether the egg weight at the position 1 satisfies the condition 2 or not is carried out in the same manner as at the steps 75 and 81. If the condition 2 is not satisfied, operation of the control device is advanced to the step 90. If it is satisfied, at the step 87 it is determined in the same manner as that at steps 76 and 82 that the egg showing the egg weight at the position 1 should be selected for one pack. At the step 88 the same judgement as that at the steps 77 and 83 is made and, if the selection for the egg showing the egg weight at the position P1 does not correspond to the 10th, operation of the control device is advanced to the step 90. If the selection corresponds to the 10th, it is determined at the step 89 in the same manner as at the step 78 that the eggs conveyed preceding to the egg showing the egg weight at the position P1, including this egg, are not used for the subsequent selections. Further, it is judged at the step 90 whether the variant X is for the position P2 or not, and if the variant is for the position P2, operation of the control device is returned to the step 71. If it is not for the position P2, at the step 91 the position set for the variant X is decreased by one, that is, if the variant is for the position P11, the position P11 is decreased to the position P10 or if the variant is for the position P10, the position P10 is decreased to position P9 and then operation of the control device is returned to the step 80, in which the foregoing procedures are repeated. The eggs determined to be selected as described above are released from the grip portion 4 and charged into the container 34 upon delivery of the release instruction by the execution of the step 71, when the eggs are conveyed by the conveying device 3 to the position for the packing line 13. Then when the charging of 5 eggs to the container 34 has been completed, the control device 5 delivers the one—half step instruction to the drive mechanism 29 by the execution of the step 71, by which the drive mechanism 29 causes the conveyor to run for advancing the container 34 by one—half step in the direction C. Further, if the ten eggs have been charged, the control device 5 delivers the full—step instruction to the drive mechanism 9 by the execution of the step 71, by which a new container 34 is prepared for one pack.

Further, those eggs which have not been selected in the operations as described above are charged into the containers on the conveyors 10-12 and 14 ∝ 17 respectively in accordance with the ordinary weight divisions.

Although, in this embodiment, the memory positions in the memory device 6 have been explained regarding P1-P11 alone, this invention is not limited thereto but they may be of any optional number. Further, although, in this embodiment, the program is so adapted that operation of the control device is advanced from the steps 78 to the step 79, from the step 84 to the step 85 and from the step 89 to step 90 respectively, this invention is not limited thereto and, for example, it may be so adapted that operation of the control device is advanced from each of the steps 78, 84 and 89 directly to the step 71.

We claim:

1. A sorting and packing device for eggs, comprising:
first means for measuring weights of eggs supplied thereto,
second means electrically connected to said first means for storing egg weights measured by the first means,
third means electrically connected to said second means for comparing an egg weight corresponding to an egg and read out from the second means with a predetermined weight range, determining said egg to be selected as one egg for one pack in the case where said egg weight is present within the predetermined weight range in said first comparision and then secondly comparing another weight corresponding to another egg and read out from the second means with a weight range which is newly set based on said egg weight of said determined egg to be selected in order to determine a next one egg to be selected for said one pack, and for thirdly comparing said another weight with said predetermined weight range in the case where said egg weight is not present within the predetermined weight range in said first comparison, determining said another egg to be selected an one egg for said one pack in the case where said other egg weight is present within the predetermined weight range in said third comparison, and then fourthly comparing said egg weight with a weight range which is newly set based on said another egg weight of said determined egg to be selected in order to determine next one egg to be selected for said one pack, and
fourth means electrically connected to said third means for packing egg showing egg weights selected by said third means.

2. The sorting and packing device according to claim 1, in which the third means is so constructed that after having selected in a preceding selection the number of egg weights corresponding to a predetermined number of eggs to be packed into one pack, stored egg weights corresponding to eggs which have been conveyed to the first means prior to an egg showing egg weight determined lastly to be selected in said preceding selection and which have not been selected in said preceding selection are not used for subsequent selections.

3. The sorting and packing device according to claim 1, in which said first means comprises a single weighing meter.

4. The sorting and packing device according to claim 1, in which said first means comprises a plurality of weighing meters arranged in parallel to one another.

5. The sorting and packing device according to claim 1, in which said second means stores respective egg weights corresponding to eggs weighed by the first means in the same order as that of respective eggs supplied to the first means.

6. The sorting and packing device according to claim 1, in which said third means comprises means for judging presence or absence of each of the stored egg weights between predetermined upper and lower limits of egg weight which are required of eggs to be packed into one pack before the respective egg weights are compared with said predetermined weight range.

7. The sorting and packing device according to claim 1, in which said predetermined weight range and said weight range are respectively set based on the number of eggs to be packed into one pack, total weight of eggs to be packed into one pack, upper and lower limits of egg weight which are required of eggs to be packed into one pack, and the sum of egg weights determined to be selected.

8. The sorting and packing device according to any one of claims 1 to 2, which further comprises means for packing eggs showing egg weights which have not been selected by said third means.

* * * * *